United States Patent [19]

Barker et al.

[11] Patent Number: 4,504,314

[45] Date of Patent: Mar. 12, 1985

[54] ALKALI METAL SILICATE BINDER COMPOSITIONS

[75] Inventors: Sidney A. Barker; Neil Baggett, both of Birmingham; John Stevenson, Sutton Coldfield; David R. deCourcy, Birmingham, all of England

[73] Assignee: Foseco International Limited, Birmingham, England

[21] Appl. No.: 554,711

[22] Filed: Nov. 23, 1983

[30] Foreign Application Priority Data

Dec. 11, 1982 [GB] United Kingdom ............ 8235375

[51] Int. Cl.$^3$ ............................................. B28B 7/34
[52] U.S. Cl. ............................ 106/38.35; 106/38.5 R; 106/80; 106/38.51
[58] Field of Search .............. 106/80, 38.5 R, 38.35

[56] References Cited

U.S. PATENT DOCUMENTS

| | | | |
|---|---|---|---|
| 2,855,318 | 10/1958 | Kerla | 106/80 |
| 4,070,196 | 1/1978 | Kraak | 106/38.35 |
| 4,194,918 | 3/1980 | George | 106/80 |
| 4,329,177 | 5/1982 | George | 106/38.35 |
| 4,341,559 | 7/1982 | Friedemann | 106/38.35 |
| 4,391,642 | 7/1983 | Stevenson | 106/38.23 |
| 4,396,430 | 8/1983 | Matalon | 106/38.5 R |

FOREIGN PATENT DOCUMENTS 2042547  1/1980  United Kingdom .

*Primary Examiner*—Lorenzo B. Hayes
*Attorney, Agent, or Firm*—Cushman, Darby & Cushman

[57] ABSTRACT

A binder composition in aqueous solution, suitable for use in the production of foundry sand moulds and cores is obtained by mixing an alkali metal silicate, glycosylated polyhydric alcohols produced by acid catalyzed condensation of a carbohydrate having a reducing group and an alcohol having two or more hydroxyl groups, and optionally an oxyanion salt such as a borate.

8 Claims, No Drawings

ALKALI METAL SILICATE BINDER COMPOSITIONS

This invention relates to alkali metal silicate binder compositions particularly for use in the production of foundry moulds and cores.

It is common practice to use aqueous alkali metal silicate solutions, particularly sodium silicate solutions as binders for sand for the production of foundry moulds and cores. The solutions usually contain 40–50% by weight of a sodium silicate having a $SiO_2$:$Na_2O$ ratio of from 2.0:1 to 3.0:1. In one process the sodium silicate solution is mixed with sand, and the resultant mixture is formed into a mould or core. Carbon dioxide gas is then blown through the mould or core, and due to chemical reaction between the sodium silicate and the carbon dioxide a bonded mould or core results. In another process a so-called hardener, which may be for example, a mixture of diacetin and triacetin, is mixed with sodium silicate and sand, and the mixture is formed into a mould or core, which on standing hardens due to chemical reaction between the hardener and the sodium silicate.

A disadvantage of silicate-bonded sands is that after casting the moulds and cores are difficult to break-down and remove from the solidified cast metal. This can be particularly disadvantageous in the case of cores of complex shape, and when the moulds and cores are used for the production of castings in metals which are cast at high temperatures, e.g. steel castings. Accordingly, numerous proposals have been made in the past to add materials, so-called break-down agents, to the mixture of sand and sodium silicate, which will aid the break-down or disintegration ability of the sand mould or core after casting.

Examples of break-down agents which have been used include coal dust and carbohydrates such as cellulosic materials, e.g. woodflour, starches, starch derivatives e.g. starch hydrolysates and sugars e.g. sucrose and dextrose.

When break-down agents are used it is advantageous if they can be mixed with or dissolved in the sodium silicate solution since homogenisation of the sand-binder mixture can then be achieved more quickly and the core or mould manufacturing process can be simplified and automated more readily.

However, if the break-down agent is to be incorporated in the sodium silicate solution it is desirable that the solution remains stable on storage, preferably for three months or more. Unfortunately certain carbohydrate materials, which have been used as break-down agents, e.g. reducing sugars such as glucose, react with the highly alkaline sodium silicate solution, and are converted into a dark coloured insoluble product. At the same time the solution increases in viscosity and will eventually become solid due to consumption of sodium hydroxide and hence an increase in the silica to sodium oxide ratio of the sodium silicate.

British Pat. No. 1546079 describes improved binder compositions containing an alkali metal silicate and a carbohydrate and having good breakdown properties and stability on storage in which the carbohydrate is a stabilised starch hydrolysate having a dextrose equivalent of less than 5. Such stabilised starch hydrolysates may be prepared from starch hydrolysates of higher dextrose equivalent by selective oxidation, reaction with urea or urea derivatives or hydrogenation, for example catalytic hydrogenation with hydrogen.

British Pat. No. 1566417 describes further improvements in alkali metal silicate-carbohydrate binder compositions in which the carbohydrate is complexed with a particular oxyanion salt, such as a borate and in which the carbohydrate may be a stablilised starch hydrolysate as described in British Pat. No. 1546079.

Similar binders are also described in British patent application No. 2042547A.

It has now been found that carbohydrates which are particularly suitable for use in alkali metal silicate binders are glycosylated polyhydric alcohols produced by the condensation of a carbohydrate having a reducing group with an alcohol having two or more hydroxyl groups using an acid catalyst.

According to the invention there is provided a binder composition in aqueous solution obtained by mixing an alkali metal silicate and glycosylated polyhydric alcohols produced by acid catalysed condensation of a carbohydrate having a reducing group and an alcohol having two or more hydroxyl groups.

According to a further feature of the invention there is provided a method of making an article of bonded particulate material such as a foundry mould or core, which comprises forming to the desired shape a mixture comprising particulate material and a binder composition in aqueous solution obtained by mixing an alkali metal silicate and glycosylated polyhydric alcohols obtained by acid catalysed condensation of a carbohydrate having a reducing group and an alcohol having two or more hydroxyl groups, and causing or allowing the mixture to harden.

The preferred alkai metal silicate is sodium silicate. The $SiO_2$:$Na_2O$ ratio of the sodium silicate may vary widely, e.g. from 2.0:1 to 3.5:1 but sodium silicates having a ratio of from 2.0:1 to about 2.5:1 are preferred.

The carbohydrate which is condensed with the alcohol may be one which is inherently reducing or one in which reducing power is generated by for example hydrolysis of a non-reducing carbohydrate prior to condensation. The carbohydrate may also be a mixture of reducing carbohydrates whose reducing power has been increased by the hydrolysis of higher molecular weight, lower reducing power carbohydrates prior to condensation.

Examples of suitable carbohydrates include monosaccharides such as glucose or mannose, disaccharides such as maltose, lactose or sucrose, oligosaccharides as in starch dextrin or polysaccharides such as starch or cellulose. Carbohydrates-containing materials which contain a mixture of reducing carbohydrates such as starch hydrolysates or so-called glucose syrups may also be used. Other suitable carbohydrate-containing materials are whey and the mother liquor remaining after the crystallisation of glucose in the production of glucose from starch.

The alcohol containing two or more hydroxyl groups with which the carbohydrate is condensed may be for example a dihydric alcohol such as ethylene glycol, a trihydric alcohol such as glycerol or more preferably a polyhydric alcohol such as erythritol, xylitol, sorbitol or mannitol.

The acid used to catalyse the condensation of the carbohydrate and the alcohol may be any Bronsted acid, i.e. an acid which liberates hydrogen ions, other than nitric acid or an organic acid containing more than one carboxyl group. Nitric acid results in the formation of explosive compositions and organic acids having more than one carboxyl group tend to act as cross-linking agents resulting in the formation of water insoluble products, or become linked to a single carbohydrate chain resulting in a product containing acid groups which will cause gelling of the alkali metal silicate. The acid may be for example an inorganic acid such as sulphuric acid, phosphoric acid or a halogen acid, an acid salt such as sodium hydrogen sulphate, a monocarboxylic acid such as formic acid or acetic acid, an aldonic acid such as gluconic acid, a lactone of an aldonic acid such as 1.5-gluconolactone, a uronic acid such as glucuronic acid, or a sulphonic acid such as p-toluene sulphonic acid.

When the glycosylated polyhydric alcohols are produced by the condensation of a monosaccharide such as glucose and a polyhydric alcohol a relatively weak acid such as a monocarboxylic acid may be used. However when the starting carbohydrate is such that hydrolysis must be carried out prior to condensation a stronger acid such as sulphuric acid or p-toluene sulphonic acid must be used.

The reaction between the carbohydrate and the alcohol is reversible. Under acidic aqueous conditions hydrolysis takes place and when water is removed condensation is promoted. The procedure used for preparing the condensate will therefore vary depending on the starting carbohydrate material used and the composition desired in the end product. For example if the starting carbohydrate material is glucose the glucose, the alcohol and the acid can be dissolved in water and the resulting solution can be distilled to remove water and produce the condensate. On the other hand if the starting carbohydrate material is starch or a dextrin the aqueous solution will first need to be refluxed in order to hydrolyse the carbohydrate, prior to distillation to promote condensation. When producing condensates from combinations of materials such as glucose and sorbitol it is possible to melt the sorbitol, dissolve the glucose and then condense the two together in the presence of an acid using an essentially non-aqueous system.

The glycosylated polyhydric alcohols used in the binder compositions and the method of the invention are mixtures containing monoglycosylated diglycosylated, oligoglycosylated and polyglycosylated polyhydric alcohols. For example when the carbohydrate is glucose and the alcohol is sorbitol the glycosylated polyhydric alcohol is a mixture ranging from mono- through di- and tri- to poly-glucosylated sorbitol and when the reducing carbohydrate is derived from lactose the glycosylated polyhydric alcohol is a mixture of various galactosylated and glucosylated polyhydric alcohols.

The mixture of glycosylated polyhydric alcohols produced by the acid catalysed condensation process may also contain some residual uncondensed glycose and polyhydric alcohol as well as condensed glycose-glycose polymers which have not reacted with a polyhydric alcohol molecule.

The preferred acid catalysed condensation products are glycosylated polyhydric alcohols produced by hydrolysing oligosaccharides and/or polysaccharides and condensing the resulting hydrolysis products with polyhydric alcohols containing four or more hydroxyl groups in the presence of a Bronsted acid which behaves solely as a catalyst and does not react chemically with the oligosaccharide or the polysaccharide, with hydrolysis products thereof, with the polyhydric alcohol or with the glycosylated polyhydric alcohol. These products are glycosyl substituted polyhydric alcohols in which the polyhydric alcohol is preferably monosubstituted but may contain more than one glycosyl substituent per polyhyric alcohol moiety. Further the glycosyl residues are attached to each other and to the polyhydric alcohol in glycosidic linkage but the glycosyl residues may be present as pyranose or furanose based structures with differing points of attachment and differing anomeric character of their glycosidic linkages.

The linkage between the glycosyl residues of the carbohydrate is predominantly 1-6 and the major linkage between the carbohydrate and the polyhydric alcohol is via a terminal position of the polyhydric alcohol i.e. 1-1 or 1-6. Due to the pressure of such structures the glycosyl substituted polyhydric alcohols have greater ability to complex with an anion such as borate than hydrogenated starch hydrolysates in which the linkages are 1-4.

A particularly preferred product is that produced by the acid condensation of glucose and sorbitol. Such a product may contain some residual sorbitol from the condensation process, and also some glucose oligomers or polymers which are produced by the condensation of glucose molecules and which although reducing are chemical stable in aqueous alkali metal silicate solutions since they have 1-6 linkages rather than the 1-4 linkages which are present in starch hydrolysates.

The binder composition will usually contain 15-47% by weight of alkali metal silicate and 2-45% by weight of glycosylated polyhydric alcohols.

Preferably the binder composition also contains a proportion of an oxyanion salt, such as a borate, as described in British Pat. No. 1566417.

The minimum oxyanion content should preferably be 0.1% by weight of the aqueous binder composition while the maximum oxyanion content will be determined by the solubility limit of a particular oxyanion salt in the aqueous binder composition, and can therefore vary quite widely. Oxyanion salt contents of up to 5% by weight of the aqueous binder are typical.

Preferably the amount of oxyanion present is sufficient to complex substantially all of the glycosylated polyhydric alcohols present.

The preferred binder compositions contain 26-45% by weight of alkali metal silicate, 3 to 27% by weight of glycosylated polyhydric alcohols and 0.5-2.0% by weight of oxyanion salt.

The binder composition of the invention may be used to bind a variety of particulate materials but is particularly useful for bonding particulate refractory materials such as silica, olivine, chromite and zircon sands in the manufacture of foundry moulds or cores. After production the mould or core may be hardened by injection of carbon dioxide gas or alternatively a chemical hardening agent for the alkali metal silicate, e.g. a mixture of acetate esters of glycerol, may be added to the sand-binder composition mixture before the moulds or cores are formed.

The binder compositions of the invention offer a number of advantages when used in the production of foundry moulds or cores.

When moulds and cores are hardened by gassing with carbon dioxide gassing time compared with normal practice may be reduced thus resulting in a saving of carbon dioxide and there is less tendency to "overgassing" compared with binders containing silicate alone. Furthermore the moulds and cores have increased strength immediately after gassing and after storage in either dry or humid conditions, and although increased strength results, "break-down" properties, i.e. the ability to break-down and remove moulds and cores from solidified cast metal, are not impaired.

With both carbon dioxide gassed and chemically hardened silicate bonded sands it is possible to reduce the amount of sodium silicate used compared with normal practice. The break-down properties of sodium silicate-bonded sands and the surface finish of metal castings produced using such sand are both affected by the soda content of the sodium silicate binder. Thus a reduction in the amount of sodium silicate used not only produces an economic advantage in that it results in a saving of sodium silicate but also gives better break-down properties of the sand and improved surface finish on metal castings produced using the sand. Furthermore due to a lowering of the amount of residual soda in the sand after casting, the sand is more readily reclaimable for re-use.

The glycosylated polyhydric alcohols described herein are advantageous over the stabilised starch hydrolysates described in British Pat. No. 1546079 and British patent application No. 2042547A because they can be produced more readily and more economically and with less specialised equipment. The processes by which hydrogenated starch hydrolysates and similar stabilised starch hydrolysates are produced involve a number of steps and are relatively complex whereas the glycosyl substituted polyhydric alcohols used in the compositions of the invention can be produced in an essentially one step process which requires a vessel or container which can be heated, and preferably means for carrying out the process at reduced pressure.

Furthermore when used in binder compositions of the type described in British Pat. No. 1566417 they are particularly advantageous because they have greater ability to complex with anions such as borate than stabilised starch hydrolysates.

The following examples will serve to illustrate the invention:

EXAMPLE 1

In this example the temperatures stated for the condensation process are oil bath temperatures.

A binder composition (1) was prepared as follows:

A mixture of 50.5 g maltodextrin, 16 g sorbitol and 1.2 g p-toluene sulphonic acid in 70 g of water was refluxed for 3½ hours at 110° C. A partial vacuum was applied and water was removed by heating to 140°–150° C. and distilling at that temperature. The temperature was finally raised to 160° C. and heating was continued for a further 45 minutes. The resulting condensation product was dissolved in water to produce a syrup containing 70% by weight solids. 127 parts by weight of sodium tetraborate and 30 parts by weight of additional water were mixed with 1000 parts by weight of the syrup, and the resulting solution was then mixed with an aqueous sodium silicate solution having a $SiO_2:Na_2O$ ratio of 2.3:1 and a viscosity of 400 cps at the rate of 1 part of the solution to 4 parts of the sodium silicate solution.

3.5 parts by weight of the binder composition were mixed with 100 parts by weight of silica sand (Chelford 60) and the sand binder mixture was used to prepare standard A.F.S. 50 mm × 50 mm cylindrical cores. Cores were gassed for various times with carbon dioxide gas at 19°–21° C., 0.35 kg/cm² line pressure and 5.5 l/minute flow rate. The compression strengths of the cores produced were measured:

(a) on specimens immediately (i.e. within 10 seconds) after gassing
(b) on specimens stored for 24 hours in a relatively dry laboratory atmosphere
(c) on specimens stored for 24 hours in a humid atmosphere at 95% relative humidity.

The following results were obtained:

| GASSING TIME | COMPRESSION STRENGTH (kg/cm²) | | | | | |
|---|---|---|---|---|---|---|
| (SECS) | 5 | 10 | 20 | 30 | 60 | 120 |
| As gassed | 5.5 | 9.3 | 12.2 | 14.6 | 15.8 | 16.4 |
| Dry Storage | 41.2 | 32.4 | 29.5 | 27.0 | 25.6 | 25.9 |
| Humid Storage | 10.3 | 10.8 | 9.2 | 8.0 | 7.0 | 6.3 |

EXAMPLE 2

In this example the temperatures stated for the condensation process are oil bath temperatures.

A binder composition (2) was prepared as follows:

A mixture of 100 g glucose, 8 g sorbitol, 2.4 g boric acid and 1.2 g p-toluene sulphonic acid was refluxed for 50 minutes at 155° C. and water was then removed by distillation under reduced pressure over a period of 15 minutes. The resulting condensation product was blended with sodium tetraborate and sodium silicate using the procedure and amounts described in Example 1.

The resulting composition was then tested as a binder for foundry sand using the procedure described in Example 1 and compression strengths were measured immediately after gassing.

The following results were obtained:

| GASSING TIME (SECS) | 5 | 10 | 20 | 30 | 60 | 120 |
|---|---|---|---|---|---|---|
| COMPRESSION STRENGTH (kg/cm²) | 2.3 | 4.7 | 8.8 | 12.6 | 15.8 | 16.5 |

EXAMPLE 3

In this example the temperatures stated for the condensation process are the actual temperatures in the reaction vessel.

A binder composition (3) was prepared as follows:

A mixture of 143 g glucose syrup (dextrose equivalent 40–44 and solids content 70% by weight), 23 g sorbitol (70% by weight aqueous solution) and 1.2 g p-toluene sulphonic acid was distilled for 50 minutes under reduced pressure at 125° C. to remove water, and then heated for a further 10 minutes at 150° C. The resulting condensation product was blended with sodium tetraborate and sodium silicate using the procedure and amounts described in Example 1.

The resulting composition was then tested in the same way as binder (2) in Example 2.

The following results were obtained:

| GASSING TIME (SECS) | 5 | 10 | 20 | 30 | 60 | 120 |
|---|---|---|---|---|---|---|
| COMPRESSION STRENGTH (kg/cm²) | 6.4 | 9.9 | 14.8 | 16.8 | 17.5 | 19.3 |

We claim:

1. A binder composition in aqueous solution obtained by mixing an alkali metal silicate and glycosylated polyhydric alcohols produced by acid catalysed condensation of a carbohydrate having a reducing group and an alcohol having two or more hydroxyl groups, said solution being characterized by its stability on storage.

2. A binder composition according to claim 1 wherein the glycosylated polyhydric alcohols are glycosylated ethylene glycols, glycosylated glycerols, glycosylated erythritols, glycosylated xylitols, glycosylated sorbitols or glycosylated mannitols.

3. A binder composition according to claim 1 wherein the alkali metal silicate is sodium silicate.

4. A binder composition according to claim 1 comprising 15–47% by weight of alkali metal silicate and 2–45% by weight of glycosylated polyhydric alcohols.

5. A binder composition according to claim 1 which also contains an oxyanion salt.

6. A binder composition according to claim 5 wherein the oxyanion salt is a borate.

7. A binder composition according to claim 5 comprising 26–45% by weight of alkali metal silicate, 3–27% by weight of glycosylated polyhydric alcohols and 0.5–2.0% by weight of the oxyanion salt.

8. A method of making an article of bonded particulate material which comprises forming to the desired shape a mixture comprising particulate material and a binder according to claim 1, and causing or allowing the mixture to harden.

* * * * *